United States Patent
Syslak et al.

(10) Patent No.: US 6,921,584 B2
(45) Date of Patent: Jul. 26, 2005

(54) BRAZING SHEET

(75) Inventors: Morten Syslak, Karmsund (NO); Gro Stakkestad, Haugesund (NO); Jon Dag Evensen, Lier (NO); Xiao-Jun Jiang, Haugesund (NO); Børge Bjørneklett, Gjøvik (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 10/476,521

(22) PCT Filed: May 3, 2002

(86) PCT No.: PCT/NO02/00165
§ 371 (c)(1),
(2), (4) Date: May 5, 2004

(87) PCT Pub. No.: WO02/090031
PCT Pub. Date: Nov. 14, 2002

(65) Prior Publication Data
US 2004/0185293 A1 Sep. 23, 2004

(30) Foreign Application Priority Data
May 3, 2001 (NO) ................................................. 012206

(51) Int. Cl.⁷ ............................ B32B 15/20; F28F 21/08

(52) U.S. Cl. ........................ 428/654; 428/610; 428/933; 165/180; 165/905

(58) Field of Search ................................. 428/654, 610, 428/933; 165/180, 905

(56) References Cited

U.S. PATENT DOCUMENTS

| 4,649,087 A | 3/1987 | Scott et al. .................. 428/654 |
| 6,063,510 A | 5/2000 | Inabayashi et al. ......... 428/654 |

FOREIGN PATENT DOCUMENTS

EP  0 799 667  10/1997

*Primary Examiner*—Robert R. Koehler
(74) *Attorney, Agent, or Firm*—Wenderoth, Lind & Ponack, L.L.P.

(57) ABSTRACT

The invention relates to a series of extra strong and durable aluminium alloy brazing sheets with enhanced corrosion resistance for brazed heat exchangers. The alloy sheets are based on recycled materials and are suitable for manufacturing of fins, welded tubes, headers and sideplates. The alloy sheets showed improved corrosion performance with respect to pitting corrosion, excellent high temperature sagging resistance and post braze strength, and a good brazeability. By optimising the material combination of fin, tube, header and sideplates it is possible to produce a heat exchanger with adequate corrosion performance in SWAAT.

2 Claims, 4 Drawing Sheets

BRAZING SHEET

This invention relates to brazed aluminium heat exchangers, such as radiators, condensers, evaporators and heater cores, and, more particularly, to a series brazing sheets with excellent corrosion resistance and mechanical properties.

Heat exchanger units for use in automobiles were, until the 1970's, manufactured from copper and brass. The use of aluminium for automotive heat exchangers has increased dramatically in the last 20 years and aluminium brazing sheet is now an established material for the manufacture of automotive heat exchangers for the engine cooling and air conditioning systems in passenger cars and light trucks. Good corrosion resistance, formability and high thermal conductivity make aluminium an ideal material for the construction of these heat exchangers.

Aluminium brazing is now the preferred process for the production of automotive heat exchangers. Aluminium brazing involves joining of components with a brazing alloy, that is an aluminium alloy (Al—Si) whose melting point is appreciably lower than that of the components. This brazing alloy is usually placed adjacent to or in between the components to be joined and assembly is then heated to a temperature where the brazing alloy melts but not the components. Upon cooling, the brazing alloy forms a metallurgical bond between the joining surfaces of the components. In automotive heat exchanger applications, this filler metal is supplied via a thin sheet or clad on a core alloy. The core provides structural integrity while the low melting point Al—Si cladding alloy melts and flows during the brazing process, to provide upon cooling a metallic bond between the components.

Controlled atmosphere brazing (CAB) relies on a flux to react with and remove the aluminium oxide. Fluoride-based fluxes, e.g. a mixture of potassium tetrafluoro-aluminate and hexafluorotripotassium aluminate, are advantageous since they leave no corrosive residues.

An aluminium brazing sheet is manufactured by roll-bonding techniques to clad the core alloy ingot on both sides with the low melting point Al—Si alloy, or to clad the core on one side with Al—Si alloy and another side with Zn-containing alloy for sacrificial corrosion protection, which is commonly used on coolant side of heat exchanger components. It is common to use a variety of aluminium alloys for core alloy, examples being the AA 1xxx or 3xxx, and more particularly AA 1100, AA 1197, AA 3003, AA 3005 and AA 3105. Furthermore, it is common that the filler metal used to join the manifold to the tubes and other components are from the AA 4xxx series aluminium alloys or more particularly AA 4343, AA 4045, AA 4047, AA 4343+1% Zinc, and AA 4045+1% Zinc. The AA 7072 has been commonly used as waterside alloy. AA is common alloy designations by the Aluminium Association (AA).

In service the heat exchanger component may be subjected to conditions that include: mechanical loading, vibration and salt water environments during winter driving conditions. Considering a radiator, the most critical part is the tube for which high heat transfer, good corrosion resistance, both internally and externally and adequate burst strength are required. The durability of a brazed aluminium heat exchanger in a corrosive environment is dependent on the inherent corrosion performance of each component (header, fin, tube, etc.) and their relative electrochemical behaviour. It is common practice to tailor the fin/fin-cladding and header/header-cladding in such a way that these components and the fillers become sacrificial to the tube.

The alloy development is driven by customers' demands for downgauging, cost reductions, enhanced unit performance and longer service lives. High strength in combination with long-life corrosion performance is the prerequisite to enable down-gauging for lighter heat exchangers, or to use higher pressure for increased cooling efficiency. With conventional alloys, it has been extremely difficult to achieve downgauging and downsizing. In addition, the desire for closed loop recycling of process scrap during manufacture and units at the end of the vehicle life is now a consideration.

The main object of this invention is to provide a series of improved strong and long life corrosion resistant aluminium brazing sheets with the optimised combination of core and clad for manufacturing of welded tubes and headers. The core is clad on both sides with a brazing metal, or clad on one side with the brazing metal but on another side with AA 7072, or clad on one side with the brazing metal but on another side with a new inner cladding alloy. The alloys for the core and clad can be produced from recycled materials.

Another object of this invention is to provide an improved strong and long life corrosion resistant aluminium brazing sheet with the optimised combination of core and clad for manufacturing of sideplates. The core is clad on one side with the brazing metal. The alloys for the core and clad can be produced from recycled materials.

It is yet another object of this invention to provide an improved recyclable and strong long life corrosion resistant aluminium alloy for manufacturing unclad fin for welded tube and mechanically assembled heat exchangers.

It is yet another object of this invention to provide an improved recyclable and strong long life corrosion resistant aluminium alloy sheet for manufacturing clad fin for extruded tube for both brazed and mechanically assembled heat exchangers. The alloy sheet consists of a core and a brazing metal clad on one side of the core.

It is still another object of this invention to provide an improved recyclable and strong aluminium inner cladding alloy for waterside application of tube and header to enhance the overall strength and resistance to waterside erosion/corrosion.

It is still another object of this invention to produce heat exchangers with adequate corrosion performance in SWAAT (Sea Water Acetic Acid Test, ASTM G85) with alloy of this invention by optimising the material combination of fin, tube, header and sideplates.

These and other objects of the invention are obtained by the products as described below. The invention is further described and characterized by the accompanying patent claims. The invention is further illustrated by the FIGS. 1–4, where FIG. 1 shows the comparison of post-braze mechanical properties and sagging resistance of sheet 4 to sheet 8.

Figure 1:
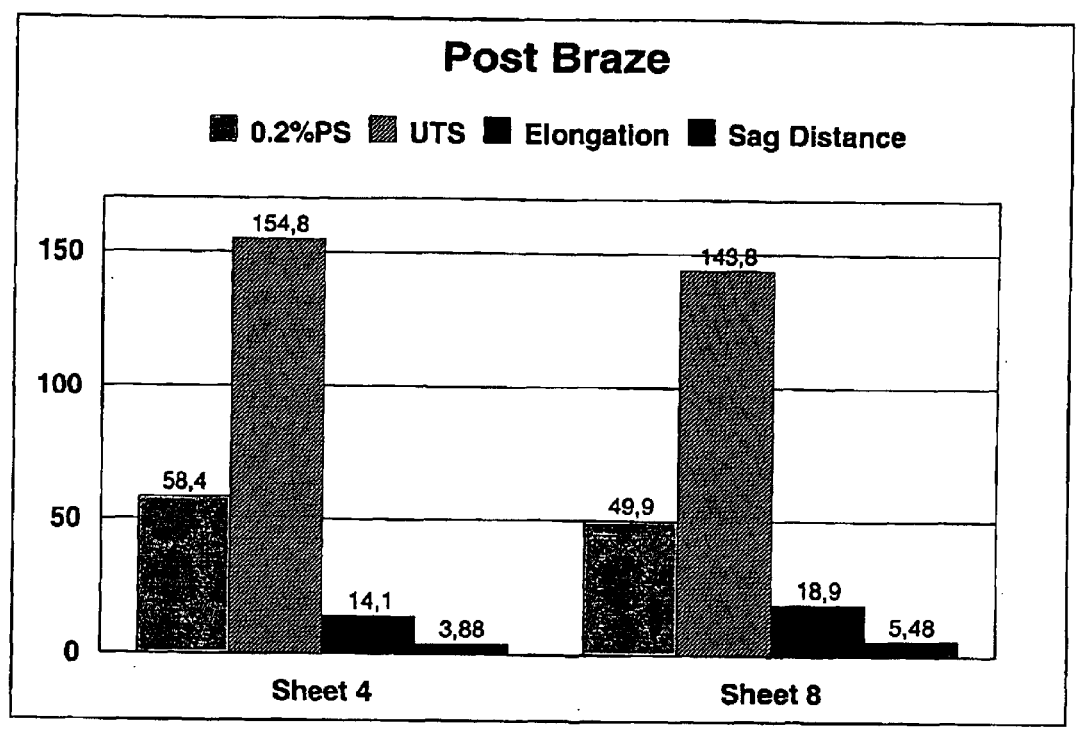

The invention thus concerns a method of increasing the corrosion durability and mechanical properties of a series brazing sheets, and furthermore, a heat exchanger, wherein the composition of core and clad alloys and the combination of fin, tube, header and sideplates have been optimised.

The preferred brazing alloy consists essentially of 4–14 weight % Si, maximum 0.8 weight % Fe, maximum 0.5 weight % Cu, maximum 0.5 weight % Mg, maximum 0.5 weight % Mn, 0.1–2 weight % Zn, maximum 0.5 weight % Ti. The maximum content of other elements is 0.05 weight % each and a total of 0.15 weight % other elements, and the balance aluminium.

The invention also includes an aluminium core alloy for tube, header and sideplates with a relatively high melting point, clad to at least one side of said core of an aluminium alloy with relatively low melting point of the above given compositions, suitable for controlled atmosphere brazing. The aluminium alloy core should preferably consist of 0.7 to 1.5 weight % Mn, maximum 0.6 weight % Si, maximum 0.6 weight % Fe, maximum 0.6 weight % Zn, maximum 1.0 weight % Cu, maximum 0.4 weight % Mg, maximum 0.5 weight % Ti. The maximum content of other elements is 0.05 weight % each and a total of 0.15 weight % other elements, and the balance aluminium.

The invention also includes an aluminium core alloy for fin with a relatively high melting point, unclad or clad to at least one side of said core of an aluminium alloy with relatively low melting point of the above given compositions, suitable for controlled atmosphere brazing. The aluminium alloy core has the composition: 0.7 to 1.5 weight % Mn, maximum 1.2 weight % Si, maximum 0.6 weight % Fe, 0.1–2 weight % Zn, maximum 1.0 weight % Cu, maximum 0.4 weight % Mg, maximum 0.5 weight % Ti. The maximum content of other elements is 0.05 weight % each and a total of 0.15 weight % other elements, and the balance aluminium.

In addition, the invention includes an aluminium inner cladding alloy which has the composition: 0.7 to 1.5 weight % Mn, maximum 1.2 weight % Si, maximum 0.6 weight % Fe, 1.0–2.0 weight % Zn, maximum 0.5 weight % Cu, 0.5 weight % Mg, maximum 0.5 weight % Ti. The maximum content of other elements is 0.05 weight % each and a total of 0.15 weight % other elements, and the balance aluminium. This alloy is clad on waterside of tube and header to enhance the overall strength of the components and also to enhance the waterside erosion/corrosion resistance.

The general role of different elements in 3xxx, 4xxx and 7xxx type alloys is described as follows:

The amount of Si affects the melting point of the brazing alloy. The patented brazing sheet from Alcan (U.S. Pat. No. 5,041,343, 1991) claims that Si in core should be <0.15 weight %. However, with respect to the claimed aluminium core and inner cladding materials, Si together with Fe is present at a level that is commonly found in recycled materials.

Zn renders the alloy less noble. It can be actively used to alter the corrosion potential of the various components (cladding, fin, header). By the concept of design against corrosion it is possible to direct corrosion attack preferentially to the least harmful regions of the heat exchanger e.g. fins and/or fillet area, thus protecting the tube from perforation. And also it is thought that relatively small amounts of Zn will make the oxide weaker resulting in lateral corrosion attacks rather than pitting. In 7xxx alloys, Zn is the main alloying element.

Similar to Zn, Cu also give a strong electrochemical effect on the material. In addition, Cu contributes to solid solution strengthening of the material. A higher concentration of Cu in the core will result in diffusion of Cu into the clad thus depleting the surface zone and making this less noble compared to the bulk.

Mn is the main alloying element in 3xxx alloys. At elevated temperature during brazing here is a driving force for diffusion of Si from clad towards the core. As the Si level rise at the surface of the core the solid solubility of Mn drop and AlMnSi despersoids precipitate in a dense band underneath the surface of the core. In addition, there is a transformation of coarse $(FeMn)Al_6$ constituents into $\alpha$-Al (FeMn)Si particles. After brazing this results in a layer with less Mn in solid solution at the surface of the core that makes it less noble than the bulk material. Thus the top layer acts sacrificial with respect to the bulk of the core and protects the tube from perforation. The width of the anodic layer is directly proportional to the depth of Si diffusion during brazing.

In the core material Mg primarily contributes to solid solution strengthening of the material. However, when normal Nokolock™ flux is used for brazing, the content has to be restricted to maximum about 0.4 weight % in the core and about 0.1 weight % in the brazing clad, respectively, since higher levels will reduce the brazeability of the sheet. During brazing Mg diffuses towards the surface and reacts with the Nokolock™ flux and thereby reduces the wetting action of the molten clad material. In the claimed inner cladding, Mg is present together with Si and Zn. After brazing, this will make the waterside layer age hardened during storing and in service, resulting in the increase in the erosion/corrosion resistance and also the increase in the overall strength of the components.

Ti and titanium boron ($TiB_2$) is added as grain refiner which is important in connection with casting of the slabs. Grain refinement cause more uniform distribution of the alloying elements throughout the slab and reduce the risk of causing defects and large segregation. It is preferred to have a maximum content of 0.05 weight % Ti in the alloys.

Recycled metal contains relatively high levels of Fe (up to 0.8 weight %). In order to lead to both energy and cost saving, ideally both core and clad materials should be produced from as much recycled metal as possible. There is a compromise between amount of scrap entering industrial production and final corrosion properties of the product. Pitting corrosion may take place in the vicinity of $Al_3Fe$ particles which are highly cathodic compared to the matrix. However, when Mn is present, $(Fe,Mn)$—$Al_6$ particles will form instead and these particles have approximately the same electrochemical potential as Al. The size and distribution of Fe-based primary particles may play a major role in whether the mode of corrosion attack will be pitting or general.

The investigation related to this invention indicated that the presence of Si and/or Fe in core has detrimental effect on the corrosion performance of the brazing sheets. The addition of Zn in the core has no big effect on the corrosion resistance of the sheets. Increasing Zn content in clad tends to prevent tube from perforation. However, there is a connection between allowable Fe content in the core and Zn content in the clad for brazing sheet to have an excellent pitting corrosion resistance.

It has been well established that the corrosion performance of the long life corrosion resistant tube alloys can be attributed to a number of factors: formation of a sacrificial precipitation band/sacrificial layer long-life mechanism; elongated grain morphology; and formation of Cu depletion band (referred to "Development of higher strength core alloys—potentials and limits", by A. Burger, K. Vieregge, A. Haszler, N. D. A. Kooij and T. J. Hurd, 1st International Congress "Aluminium Brazing", 10th to 12th May 2000, Dussedorf).

Formation of a sacrificial precipitation band is the so-called sacrificial layer long-life mechanism. Before brazing, clad contains high amount of Si. As it has been mentioned before, during brazing, the diffusion of Si from clad to core stimulates the precipitation of fine α-AlMnSi particles and a high density of these precipitates formed just beneath the clad/core interface (BDP). BDP is usually less noble than the core. Thus, BDP transforms the corrosion attack from the extremely harmful pitting corrosion to a lateral corrosion, preventing through thickness perforation.

An additional way of enhancing corrosion is created by extending the perforation corrosion path. Perforation of brazing sheet by corrosion is predominantly caused by intergranular corrosion. By elongating the grains and creating a "pancake" structure, the intergranular path length increases significantly. In addition, compared to smaller circular grains less grain boundaries exist. Therefore, the intergranular corrosion has to go on a more tortuous path before perforation takes place. Moreover, large grains also give good brazeability and excellent sagging resistance of the sheets. Elongated grain morphology can be achieved through H14 and H24 tempers.

Another mechanism contributing to the excellent corrosion properties could be the formation of a Cu depletion band at the surface of the brazed materials. Relatively high amount of Cu in the core can create a thick Cu depleted band at the surface of brazed materials by diffusion of Cu from the core (high Cu) into the (molten) clad materials (low Cu). The depletion of Cu from the material at the surface renders it less noble compared to the bulk material. The lower Cu concentration at the surface could therefore give rise to a sacrificial band (less noble band) which may be a reason for the good corrosion performance.

In this invention, the long life corrosion performance of the alloy sheets might also be explained by a combination of two or all three corrosion protection mechanisms mentioned above. In addition to these, an additional way of enhancing corrosion protection of the alloy sheets could be the diffusion of Zn from the braze clad into the core during brazing due to the high Zn content in the clad. This results in a concentration gradient of Zn from surface towards the centre of the core. Since Zn renders the alloy less noble, as the corrosion proceeds in the sheets, the Zn concentration gradient at the surface continually provides additional preferential cathodic protection for the sheet core regions to prevents pit formation. This could account for the better corrosion performance achieved by alloys of the invention.

The aluminium alloy sheets of the invention are provided in an O temper, or in a H14 temper or in a H24 temper before the sheets are subjected to a brazing cycle.

The alloy sheets of the invention for tube and header applications are manufactured in the following way:

1) casting an ingot of the core alloy;
2) providing the core alloy with the brazing layer of the invention on one side and a AA7072 on another side, or with the brazing layer on one side and the new inner cladding layer of the invention on another side, or with the brazing layer on both sides;
3) hot rolling the core alloy with the brazing layer on one side and a AA7072 on another side, or with the brazing layer on one side and the new inner cladding layer of the invention on another side, or with the brazing layer on both sides;
4) cold rolling the core alloy with the brazing layer on one side and a AA7072 on another side, or with the brazing layer on one side and the new inner cladding layer of the invention on another side, or with the brazing layer on both sides, to the desired finished gauge, wherein between above steps 1) and 2) said aluminium core alloys and aluminium alloy ingots are not subjected to a homogenisation treatment. The cast ingots are only preheated to a desired starting temperature suitable for hot rolling The alloy sheets of the invention for sideplates and clad fin application are manufactured in the following way:

1) casting an ingot of the core alloy;
2) providing the core alloy with the brazing layer of the invention on one side;
3) hot rolling the core alloy with the brazing layer on one side;
4) cold rolling the core alloy with the brazing layer on one side, to the desired finished gauge, wherein between above steps 1) and 2) said aluminium core alloys and aluminium alloy ingots are not subjected to a homogenisation treatment. The cast ingots are only preheated to a desired starting temperature suitable for hot rolling The alloy sheets of the invention for unclad fin application are manufactured in the following way:

1) casting an ingot of the alloy.
2) hot rolling the alloy.
3) cold rolling the alloy, to the desired finished gauge, wherein between above steps 1) and 2) said aluminium core alloys and aluminium alloy ingots are not subjected to a homogenisation treatment. The cast ingots are only preheated to a desired starting temperature suitable for hot rolling. By avoiding the need for a homogenisation treatment the processing route is simplified, while the products allow for obtaining a further improved strength in the post-braze condition, and further are still capable of achieving a good corrosion resistance.

Furthermore, an important aspect of the invention is to provide the method of producing a brazed assembly, in particular a brazed heat exchangers, with adequate corrosion performance in SWAAT, using the alloy sheets of the invention by optimising the material combination of fin, tube, header and sideplates. By optimising the combination of clad and core of tube, header and sideplates and fin alloy, the clad can/may have a higher concentration of Zn than fin alloy before brazing. Because of the diffusion of Zn, a concentration gradient of Zn formed from the airside of fin towards the tube core during brazing. The resulting fillet is less anodic than the fin. Therefore, the whole heat exchanger system will end up with a good corrosion design situation with the fin protecting the tube and the fillet cathodically.

The invention also includes a new inner cladding alloy (waterside alloy). Due to the presence of Mg together with Zn and Si in the alloy, after brazing, high strength is achieved in this inner cladding layer by age hardening during storing and in service. As a consequence, the overall strength of the tube and header and moreover the whole assembly is increased. The maximum resistance to waterside erosion/corrosion can be achieved by using this alloy.

The alloy sheets in accordance with the invention will now be illustrated by non-limitative examples.

EXAMPLES

The following test was carried out on Norsk Hydro produced full scale alloy sheets 1 to 4 and lab scale alloy sheets 5 and 6, and full scale comparative alloy sheets 7 which is the standard AA3003 and 8 which is Sapa's long life alloy 3005LL. Ingots of aluminium alloys for use as core alloys in lab scale brazing sheets 5 and 6 were cast and solidified at a cooling rate similar to those cooling rate occurring in a commercial DC casting. The compositions of the alloys are given in Table 1. The alloys were cast, preheated prior to hot rolling, hot rolled and cold rolled to achieve O temper, H14 or H24 temper. The results given here were from the sheets in H24 temper.

TABLE 1

Composition of core and clad

| Sheet No. | Alloy  | Si    | Fe    | Cu    | Mn    | Mg    | Cr    | Zn    | Ti     |
|-----------|--------|-------|-------|-------|-------|-------|-------|-------|--------|
| 1         | Core   | 0.52  | 0.21  | 0.25  | 1.19  | 0.31  | 0.001 | 0.18  | 0.03   |
|           | Clad 1 | 7.6   | 0.16  | 0.02  | 0.08  | 0.02  | 0.003 | 0.8   | 0.01   |
|           | Clad 2 | 7.7   | 0.15  | 0.02  | 0.08  | 0.02  | 0.002 | 1.14  | 0.01   |
| 2         | Core   | 0.13  | 0.2   | 0.26  | 1.14  | 0.34  | 0.001 | 0.64  | 0.01   |
|           | Clad 1 | 7.6   | 0.16  | 0.02  | 0.08  | 0.02  | 0.003 | 0.8   | 0.01   |
|           | Clad 2 | 7.7   | 0.15  | 0.02  | 0.08  | 0.02  | 0.002 | 1.14  | 0.01   |
| 3         | Core   | 0.41  | 0.43  | 0.25  | 1.14  | 0.32  | 0.001 | 0.42  | 0.03   |
|           | Clad 1 | 7.6   | 0.16  | 0.02  | 0.08  | 0.02  | 0.003 | 0.8   | 0.01   |
|           | Clad 2 | 7.7   | 0.15  | 0.02  | 0.08  | 0.02  | 0.002 | 1.14  | 0.01   |
| 4         | Core   | 0.245 | 0.498 | 0.076 | 1.258 | 0.244 | 0.016 | 0.193 | 0.024  |
|           | Clad 1 | 7.94  | 0.29  | 0.01  | 0.03  | 0.01  | 0.005 | 1.72  | 0.02   |
|           | Clad 2 | 0.16  | 0.35  | 0.02  | 0.04  | 0.03  | 0.009 | 1.24  | 0.01   |
| 5         | Core   | 0.458 | 0.482 | 0.237 | 1.158 | 0.376 | 0.001 | 0.188 | 0.015  |
|           | Clad 1 | 8.052 | 0.203 | 0     | 0.001 | 0     | 0.003 | 2.01  | 0.01   |
| 6         | Core   | 0.439 | 0.459 | 0.236 | 1.121 | 0.394 | 0.001 | 0.197 | 0.01   |
|           | Clad 1 | 7.669 | 0.179 | 0     | 0.003 | 0     | 0.003 | 1.698 | 0.01   |
| 7         | Core   | 0.310 | 0.539 | 0.102 | 1.174 | 0.041 | 0.003 | 0.020 | 0.0219 |
|           | Clad 1 | 7.265 | 0.161 | 0.013 | 0.007 | 0.030 | 0.004 | 0.032 | 0.0121 |
| 8         | Core   | 0.04  | 0.16  | 0.27  | 1.1   | 0.23  |       | 0.01  | <0.01  |
|           | Clad 1 | 7.7   | 0.18  | <0.01 | <0.01 | <0.01 |       | 0.01  |        |
|           | Clad 2 | 0.14  | 0.33  | 0.03  | 0.02  | 0.01  |       | 1.1   |        |

Mechanical properties were tested on the alloy sheets in post-braze condition. The alloy sheets were subjected to a typical brazing cycle before testing and the results are listed in Table 2, where 0.2% Proof Stress (PS), Ultimate Tensile Strength (UTS) and total elongation is given. It can be seen that the alloy sheets of the invention show a much higher post-braze strength compared to the comparative alloy sheets 7 and 8. Sagging resistance was also tested on the alloy sheets. The width of the specimen was 15 mm and the length of the beam was 50 mm. Testing of sagging resistance was performed in a brazing furnace using a typical brazing cycle. The comparison of post-braze mechanical properties and sagging resistance of sheet 4 to sheet 8 is shown in FIG. 1.

TABLE 2

Post-braze mechanical properties of the alloy sheets

| Sheet No. | 0.2% PS N/mm² | UTS N/mm² | Elogation % |
|-----------|---------------|-----------|-------------|
| 1         | 85.0          | 177.3     | 6.1         |
| 2         | 68.3          | 162.0     | 11.7        |
| 3         | 77.7          | 172.0     | 7.9         |
| 4         | 58.4          | 154.8     | 14.1        |
| 7         | 44.3          | 119.7     | 17.1        |
| 8         | 49.9          | 143.8     | 18.9        |

Figure 2:
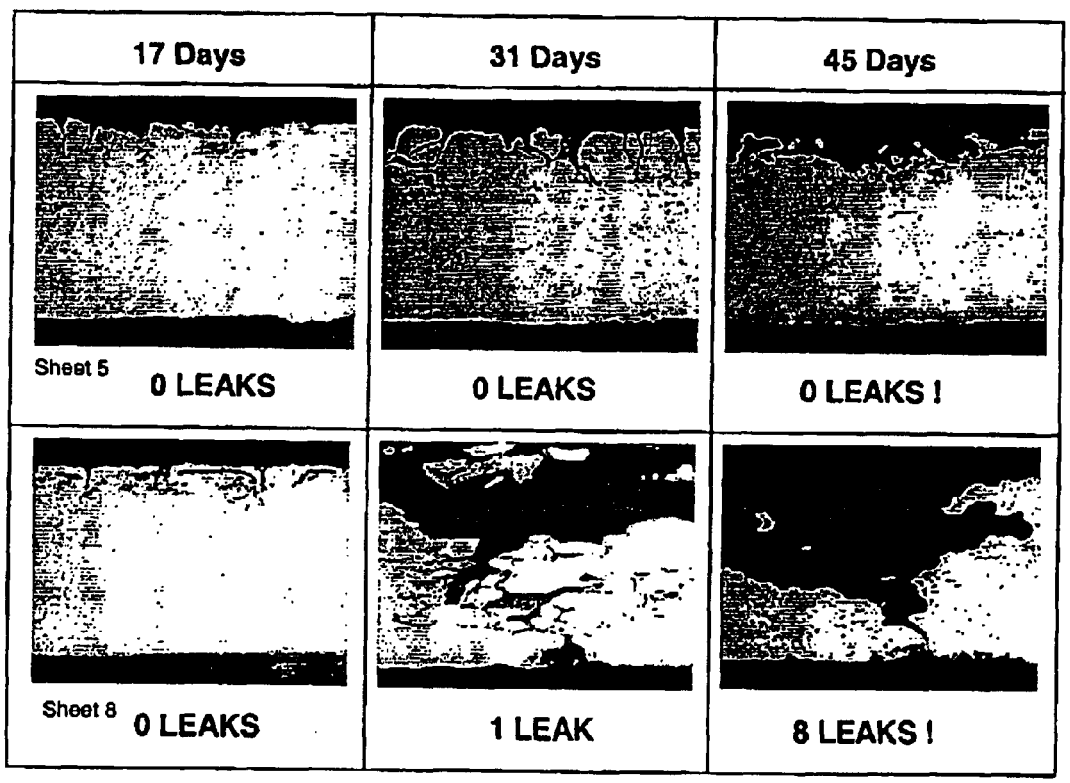
FIG. 2 shows comparison of the cross-sectional morphology of sheet 5 and sheet 8 after different SWAAT exposure times.

Plate samples were cut from the alloy sheets and were run through the brazing furnace using a typical brazing cycle. Laboratory SWAAT testing of all materials was performed at various exposure time in accordance with ASTM G 85. Samples were then removed from test and leak tested in post-SWAAT pressure-leak testing jig at 6 bar and $N_2$ was used for the testing. If any leak was detected, then it was considered that the material failed during SWAAT testing. The SWAAT testing results are listed in Table 3, in which the term >45 means that the testing has been stopped after 45 days without failure of the sample, and <31 means that the alloy failed before 31 days. FIG. 2 compares the cross-sectional morphology of sheet 5 to sheet 8 after the different SWAAT exposure times. Sheet 5 showed some kind of lateral corrosion adjacent to the surface but no deep attacks, while sheet 8 showed a typical pitting corrosion with deep attacks.

TABLE 3

The corrosion properties of the alloy sheets after brazing

| Sheet No. | SWAAT (days) |
|-----------|--------------|
| 1         | >31          |
| 2         | >31          |
| 3         | >31          |
| 4         | >45          |
| 5         | >45          |
| 6         | >45          |
| 7         | <31          |
| 8         | 31           |

From these results, it can be seen that the alloy sheets in accordance with the invention all achieved much higher post-braze strength compared to the prior art alloys 7 and 8. Moreover, the strength may further be increased by increasing the Cu level in the alloys. From the SWAAT testing results, it can be seen that the alloy sheets in accordance with this invention have an excellent corrosion resistance with respect to pitting corrosion. The alloys of this invention contain high Fe and Si content, enabling production based on recycled metal. The excellent corrosion resistance of such type of alloys is achieved through the optimisation and combination of clad and core alloys.

Figures 3A, 3B:
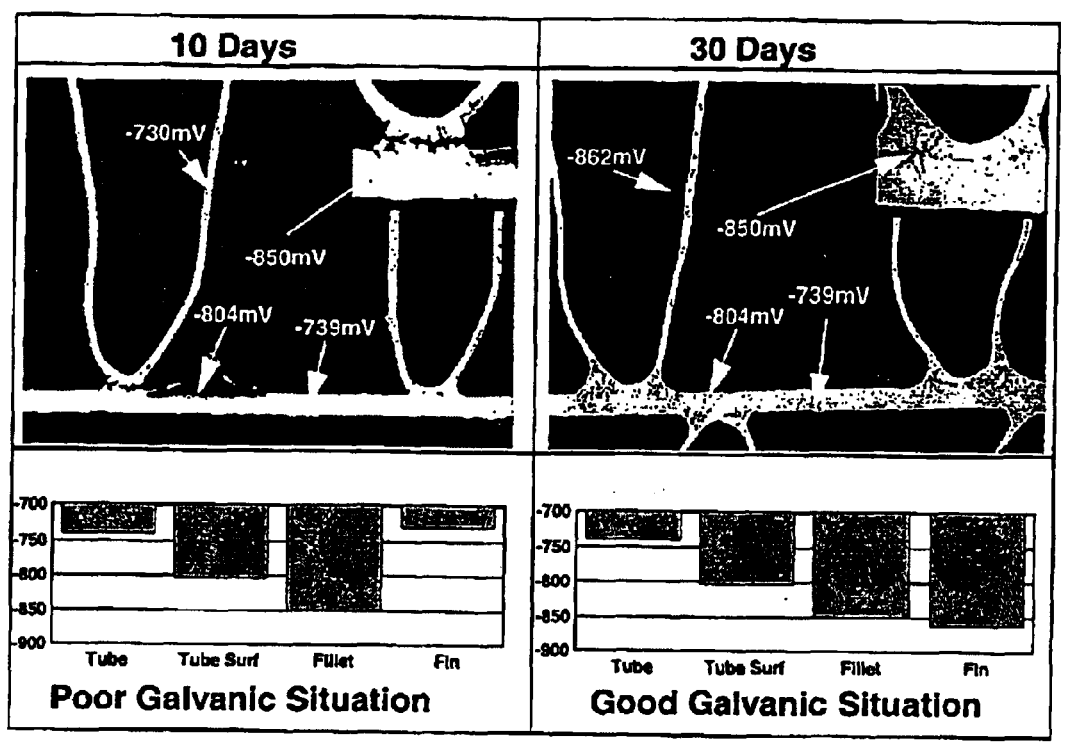
FIG. 3 shows cross-sectional morphology of the mini samples consisting of different fin joined to sheet 3 after SWAAT testing for different times (a). When AA 3003 type fin joined to the tube, the component showed poor galvanic situation (b), while the Zn-containing fin provided good galvanic protection versus tube.

FIG. 3 shows the cross-sectional morphology of mini heat exchanger samples consisting of standard AA 3003 fin (FIG. 3a) and the fin alloy of the invention (FIG. 3b) joined to sheet 3, respectively, and SWAAT tested, along with the calculated corrosion potential at different regions of the samples. It can be seen that when the AA 3003 fin was brazed to sheet 3 (FIG. 3a), the fin to sheet joint is the most anodic region in the component. After SWAAT testing for only 10 days, the joint fillets were severely corroded. The corrosion attack in the tube has propagated along the interface layer between the residual cladding and the core, which may be associated with the BDP formed during brazing. In this case, the whole component is in a poor galvanic situation. While when the Zn-containing fin of the invention was brazed to sheet 3 (FIG. 3b), the fin became the most anodic part in the component, even after 30 days of SWAAT exposure, both the fin to tube joint and the tube kept intact. In this case, the fin provided good galvanic protection against that tube.

The fin alloy of the invention were braze joined to all tube alloys of the invention and the same corrosion pattern to FIG. 3 were observed. Although in some cases, the Zn content in the clad alloy (1.72 wt. % in sheet 4, 2.01 wt. % in sheet 5 and 1.698 wt. % in sheet 5) is higher than the fin alloy (1.5 wt. %) before brazing, because of the diffusion of Zn, a concentration gradient of Zn formed from the airside of the fin surface towards the tube core during brazing. Therefore, the resulting fillet is less anodic than the fin. This indicates that by optimising the material combination of fin, tube, header and sideplates which can be produced from recycled metals, the heat exchanger will be able to give good corrosion performance.

Figure 4:
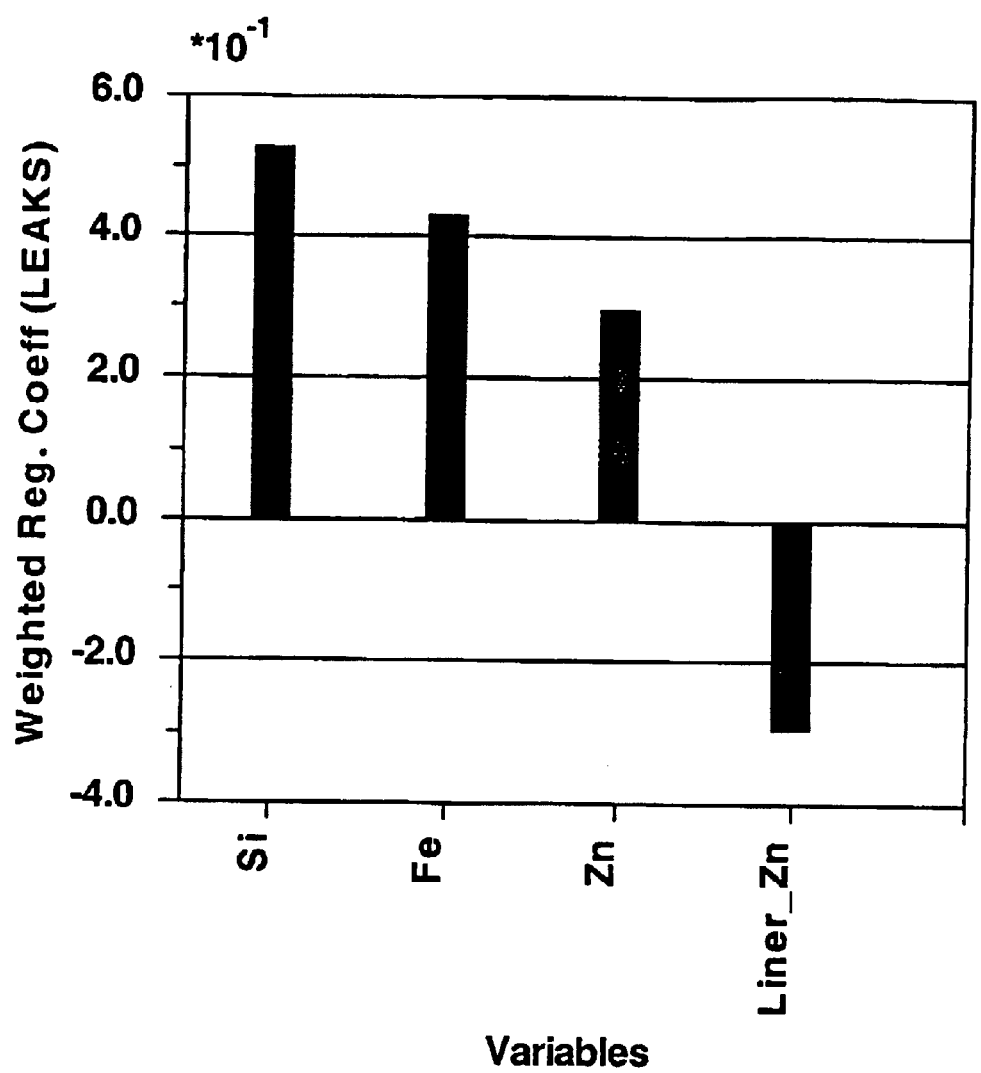
FIG. 4 shows plot which reveals the weighted regression coefficients from an empirical model where the response is number of leaks after certain amount of days in SWAAT chamber.

A regression model with ingoing parameters being alloy chemistry and the response being numbers of leaks in brazing sheets after SWAAT is extracted. FIG. 4 reveals the weighted regression coefficients. In this plot the alloying element influencing the response (Leaks) the most has a high number. If the number is positive (e.g. Fe) the alloying elements contribute to increase the number of leaks by increasing this element to the alloy, while a negative number (e.g. Liner_Zn) indicate that the element contributes to decrease the number of leaks in the brazing sheet. From the investigation related to this invention, one can find that there is a connection between the allowable Si and Fe contents in core and Zn content in clad of the tube and header. In general, a core produced from recycled material requires a high Zn concentration in clad in order for tube and header to achieve long life corrosion performance. The results indicate that the clad can/may have a higher concentration of Zn than fin alloy before brazing. By optimising the combination of clad, core and fin alloy, the whole system will end up with a good galvanic situation that the fin gives cathodic protection of the tube, header and the fillet. This is important for the total design of the heat exchangers with regard to both corrosion and heat transfer performance.

What is claimed is:

1. Heat exchanger exhibiting an optimal combination of applied Al-alloys with regard to corrosion resistance of its structural components, said heat exchanger comprising tubes for circulation of heat exchanging media made having a core of Al-alloy comprising 0.7 to 1.5 weight % Mn, maximum 0.6 weight % Si, maximum 0.6 weight % Fe, maximum 0.6 weight % Zn, maximum 1.0 weight % Cu, maximum 0.4 weight % Mg, maximum 0.5 weight % Ti, and the balance aluminium, said core being provided with an outer clad material comprising 4–14 weight % Si, maximum 0.8 weight % Fe, maximum 0.5 weight % Cu, maximum 0.5 weight % Mg, maximum 0.5 weight % Mn, 0.1–2 weight % Zn, maximum 0.5 weight % Ti, and the balance aluminium, and an inner clad material comprising 0.7 to 1.5 weight % Mn, maximum 1.2 weight % Si, maximum 0.6 weight % Fe, 1.0–2.0 weight % Zn, maximum 0.5 weight % Cu, 0.5 weight % Mg, maximum 0.5 weight % Ti, and the balance aluminium, further comprising fins comprising 0.7 to 1.5 weight % Mn, maximum 1.2 weight % Si, maximum 0.6 weight % Fe, 0.1 to 2 weight % Zn, maximum 1.0 weight % Cu, maximum 0.4 weight % Mg, maximum 0.5 weight % Ti, and the balance aluminium, and plates such as header and side plates having core comprising 0.7 to 1.5 weight % Mn, maximum 1.2 weight % Si, maximum 0.6 weight % Fe, 0.1 to 2 weight % Zn, maximum 1.0 weight % Cu, maximum 0.4 weight % Mg, maximum 0.5 weight % Ti, and the balance aluminium, said plates being optionally clad with Al-alloy comprising 4–14 weight % Si, maximum 0.8 weight % Fe, maximum 0.5 weight % Cu, maximum 0.5 weight % Mg, maximum 0.5 weight % Mn, 0.1–2 weight % Zn, maximum 0.5 weight % Ti, and the balance aluminium.

2. Heat exchanger according to claim 1, where the fins are further provided with a clad material comprising 4–14 weight % Si, maximum 0.8 weight % Fe, maximum 0.5 weight % Cu, maximum 0.5 weight % Mg, maximum 0.5 weight % Mn, 0.1–2 weight % Zn, maximum 0.5 weight % Ti, and the balance aluminium.

* * * * *